Oct. 11, 1966  M. T. GACIOCH  3,277,947
HEATING APPARATUS CONTROL
Filed Feb. 25, 1965  3 Sheets-Sheet 1
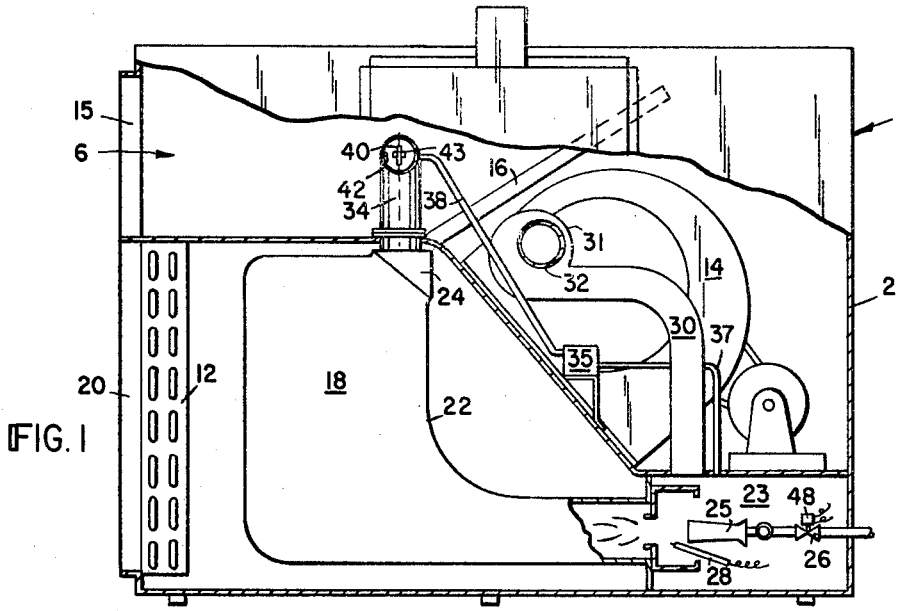
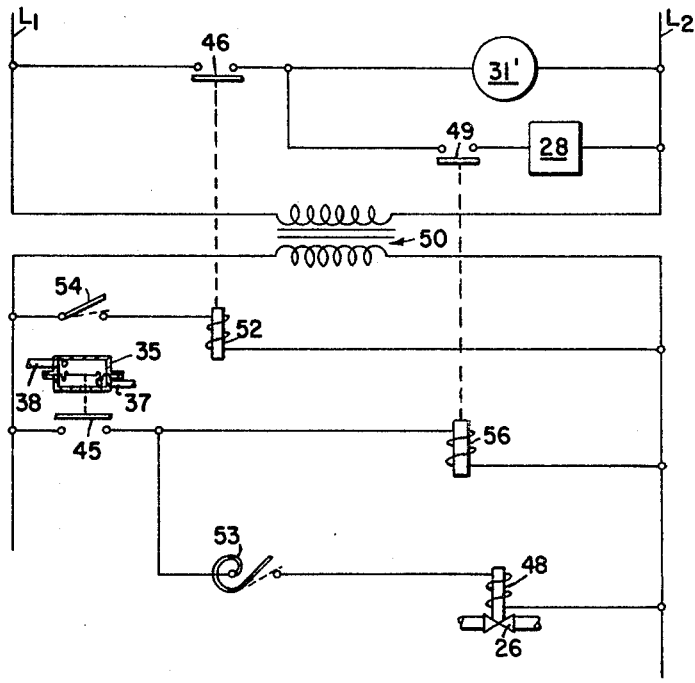
INVENTOR.
MICHAEL T. GACIOCH.
BY
Frederick E. McMullen
ATTORNEY.

Oct. 11, 1966    M. T. GACIOCH    3,277,947
HEATING APPARATUS CONTROL
Filed Feb. 25, 1965    3 Sheets-Sheet 2
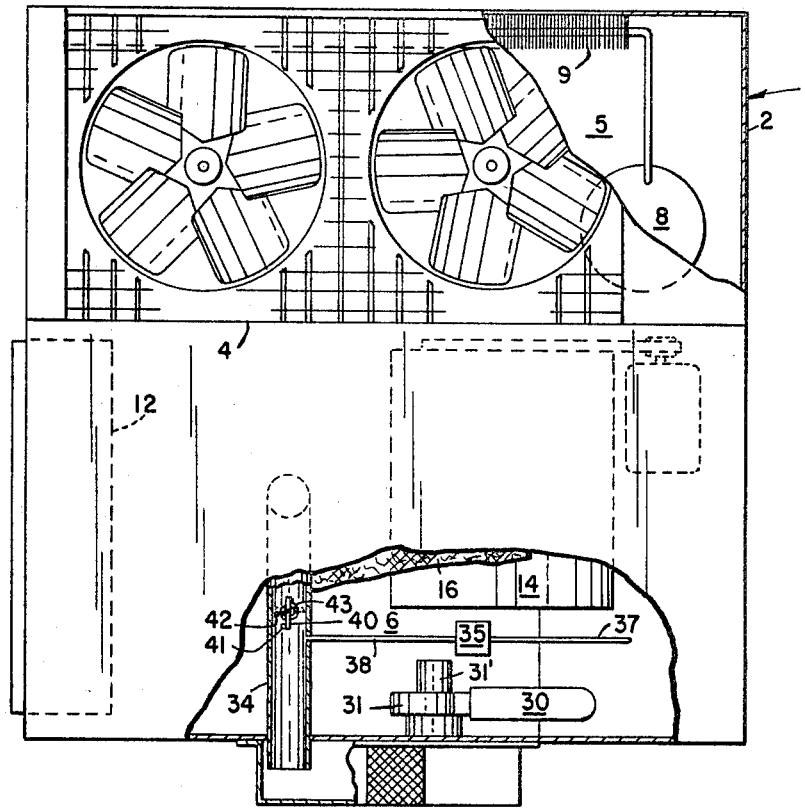
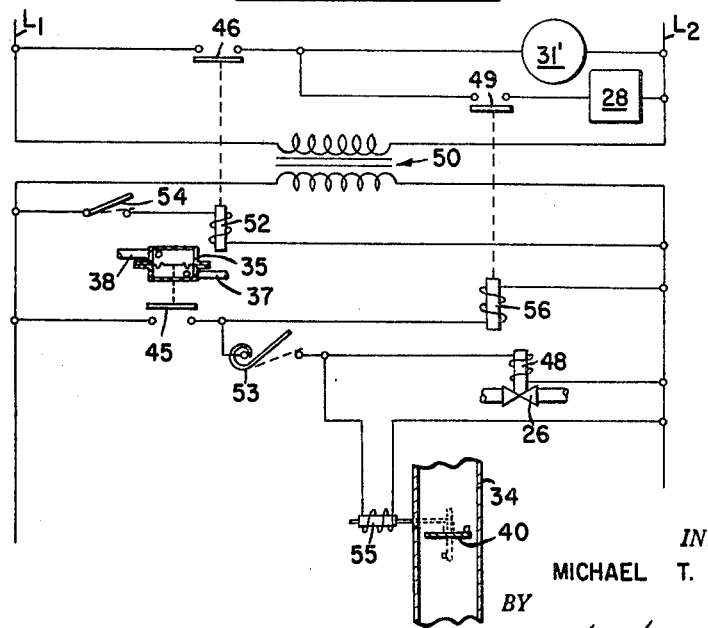
INVENTOR.
MICHAEL T. GACIOCH.
BY
Frederick E. McMullen
ATTORNEY.

Oct. 11, 1966   M. T. GACIOCH   3,277,947
HEATING APPARATUS CONTROL
Filed Feb. 25, 1965   3 Sheets-Sheet 3
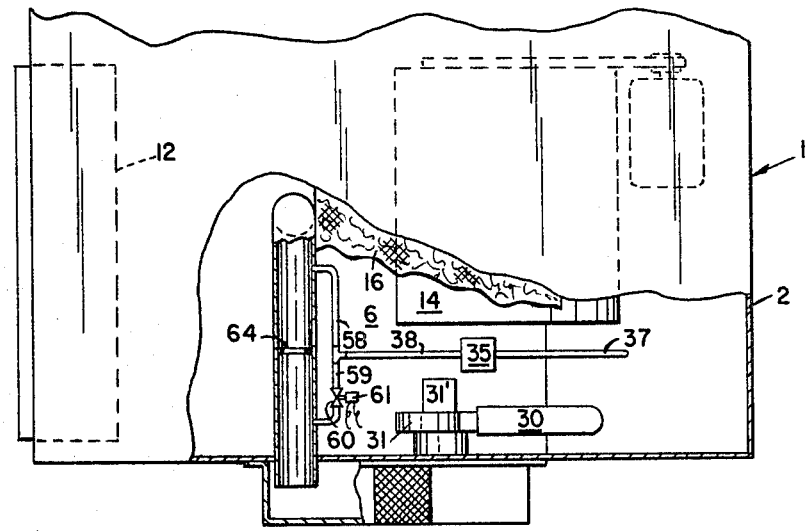
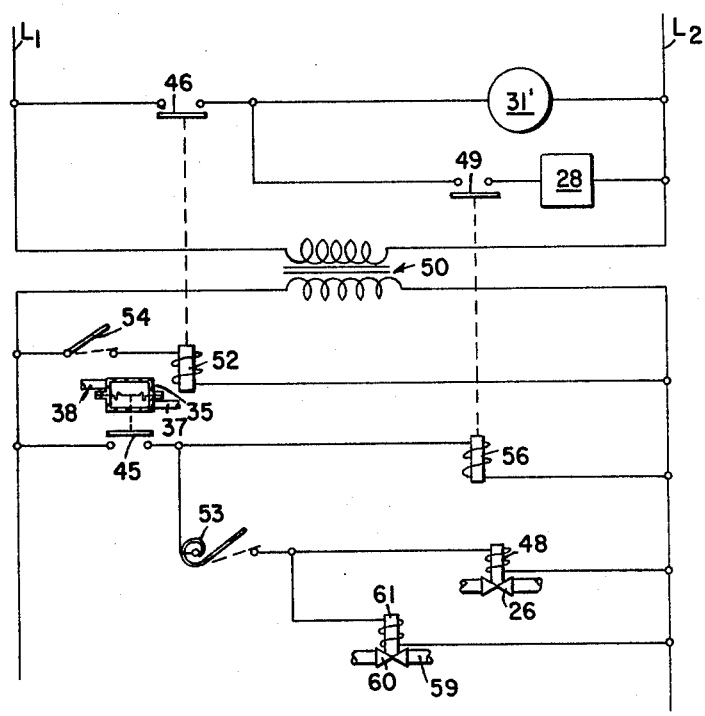
INVENTOR.
MICHAEL T. GACIOCH.
BY
Frederick E. McMullen
ATTORNEY.

United States Patent Office 3,277,947
Patented Oct. 11, 1966

3,277,947
HEATING APPARATUS CONTROL
Michael T. Gacioch, Syracuse, N.Y., assignor to Carrier Corporation, Syracuse, N.Y., a corporation of Delaware
Filed Feb. 25, 1965, Ser. No. 435,137
6 Claims. (Cl. 158—28)

This invention relates to heating apparatus and more particularly to a control arrangement for heating apparatus.

The application of pressure differential controls to heating apparatus has been suggested to regulate the apparatus in response to operating conditions. In heating apparatus of the type having a pressurized source of air for combustion, a pressure differential control device, responding to combustion air and flue gas pressures, may prevent start-up of the unit should the supply of combustion air fail or should the flue be blocked. Additionally, the pressure differential control device may serve to shut down the heating apparatus if, during operation of the apparatus, the supply of combustion air is reduced or fails entirely or the flue becomes obstructed.

The desirability in theory at least of employing a pressure differential control as outlined above is not borne out in actual practice generally because the pressure difference between combustion air and flue gas, upon which operation of the control is based, undergoes a change upon firing of the burner mechanism. If for example the pressure differential control is set to respond at a pressure differential designed to assure, before start-up, that the heating apparatus is ready to start, the subsequent changes in pressure in the apparatus occasioned by firing of the apparatus burner may so change the pressures to which the differential control responds that the control may be unable to react should a malfunction occur in the apparatus during operation. If, on the other hand, the control should be adjusted to respond to a pressure which assures shut-off of the apparatus if a malfunction occurs during heating operation, the control may be unable to prevent faulty start-ups of the apparatus.

It is a principal object of the present invention to provide a new and improved control arrangement for heating apparatus.

It is an object of the present invention to provide, in heating apparatus employing a differential type control, a mechanism for creating an artificial pressure difference across the pressure differential control prior to start-up of the apparatus.

It is an object of the present invention to provide a pressure compensating arrangement for pressure type safety controls on heating devices. Other objects will be apparent from the ensuing description.

This invention relates to an apparatus for heating which comprises in combination a combustion chamber connectable with a source of combustion air, a burner in the chamber adapted to communicate with a source of fuel, a flue for conveying products of combustion into the ambient, means for actuating the burner upon a demand for heat; differential pressure type control means having communication with the combustion chamber and the flue, the control means being adapted on a predetermined difference in pressure between the combustion chamber and the flue to override the burner actuating means and render the burner inoperative; means for increasing the pressure difference across the control means before start-up of the burner; and means responsive to actuation of the burner to render the pressure increasing means inoperative.

The attached drawing illustrates the preferred embodiment of the invention, in which:

FIGURE 1 is a view partly in elevation and partly in section of a heating apparatus embodying applicant's novel control arrangement;

FIGURE 2 is a plan view of the apparatus shown in FIGURE 1, partially broken away to disclose the control arrangement;

FIGURE 3 is a circuit diagram schematically showing the control arrangement for the apparatus shown in FIGURES 1 and 2;

FIGURE 4 is a circuit diagram schematically showing a modified control arrangement for the apparatus shown in FIGURES 1 and 2;

FIGURE 5 is a plan view similar to FIGURE 2, showing a modification of the control arrangement; and FIGURE 6 is a circuit diagram of the control arrangement shown in FIGURE 5.

Referring to FIGURES 1 and 2 of the drawings, there is shown a conditioning apparatus 1 adapted to heat or cool an area incorporating applicant's novel control arrangement. The conditioning apparatus 1 is normally disposed without the area to be conditioned, preferably outdoors. Suitable duct work may be provided communicating conditioning apparatus 1 with an area to be conditioned.

A generally rectangular housing 2, partitioned into condenser and furnace compartments 5, 6 by partition member 4, encases both the heating and cooling components of the conditioning apparatus 1. The cooling components include refrigerant compressor 8 and condenser coil 9 housed in condenser compartment 5, and evaporator coil 12, housed in furnace compartment 6, interconnected by suitable conduit means (not shown) in a closed refrigeration circuit. It is understod that suitable refrigerant expansion means (not shown) are provided in the refrigerant circuit between condenser coil 9 and evaporator coil 12.

Fan 14, disposed in furnace compartment 6, draws air to be conditioned through inlet 15 and filter 16, fan 14 discharging air through furnace heat exchanger 18 and refrigerant evaporator coil 12 into outlet 20 and the area to be conditioned. Inlet and outlet 15, 20 respectively may communicate either directly or through suitable duct work (not shown) with the source of air to be conditioned and with the area being conditioned respectively.

Heat exchanger 18 is preferably comprised of a plurality of closely spaced L-shaped heat exchange members 22 joined at one end to combustion air box 23 and at the opposite end to flue collection box 24. Burner mechanism 25, connected through gas valve 26 with a suitable source of combustible medium such as natural gas, is operatively disposed in combustion air box 23. Gas valve 26 includes solenoid-powered operator 48 therefor adapted when energized to open valve 26. Burner ignition means 28, which may be any suitable commercially available type, is provided.

Conduit 30 communicates combustion air box 23 with the discharge side of combustion air fan 31. Opening 32 in the wall of housing 2 communicates the inlet side of fan 31 with a source of combustion air, usually the atmosphere. Flue pipe or stack 34 communicates flue box 24 with the atmosphere.

A differential pressure type control device 35, which may be of any suitable commercially available type, is connected across combustion air box 23 and flue pipe 34 by lines 37, 38 respectively. Control device 35 is responsive to the difference in pressure between air box 23 and flue pipe 34, that is, the pressure difference across heat exchanger 18. A damper 40 is positioned for pivoted movement in stack 34 upstream of the junction of line 38 with stack 34. Stops 41, 42 limit rotation of damper 40 to approximately 90°, stop 41 holding damper 40 substantially parallel to the axis of stack 34 while stop 42 holds damper 40 substantially perpendicular to the axis of stack 34. Damper 40 is dimensioned so that when in closed position, the damper 40 substantially restricts the flue passage defined by stack 34. A bimetallic operator 43 controls movement of damper 40 in a manner to be more fully explained hereinafter.

Referring to FIGURE 3 of the drawings, the drive motor 31' for fan 31 is series connected with control relay contact 46 across leads $L_1$ and $L_2$. Leads $L_1$ and $L_2$ are connected to a suitable source of power (not shown). Burner ignition means 28 is series connected with switch 49 and control relay contact 46 across leads $L_1$, $L_2$.

A secondary control circuit, electrically coupled to the primary control circuit by step-down transformer 50, includes control relay coil 52 and manually actuatable switch 54 in series across the secondary winding thereof. Switch 54 is movable between an open or "off" position and a closed or "heat" position.

Switch 45 of control device 35 is series connected with relay coil 56 and with thermostatic switch 53 and solenoid 48 across the secondary winding of transformer 50. Thermostatic switch 53 closes in response to a demand for heat in the area being conditioned. It is understood that additional control circuitry (not shown) is provided for controlling operation of fan 14. Similarly, suitable control circuitry (not shown) including additional thermostatic switch means is provided for controlling operation of the unit cooling components in response to a demand for cooling.

Movement of manual switch 54 to a closed or "heat" position energizes control relay coil 52 to close control relay switch 46. Closure of switch 46 completes a circuit from lead $L_1$ through switch 46 to lead $L_2$ to energize fan drive motor 31'.

Combustion air under the influence of fan 31 pressurizes combustion air box 23, the combustion air discharging through the restricted flue passage defined by stack 34 and damper 40, held against stop 42 by bimetallic element 43, into the ambient. Control device 35, responding to the difference in pressure between combustion air box 23 and stack 34 downstream of damper 40 closes switch 45 to complete the energizing circuit to relay coil 56. Energization of relay coil 56 closes switch 49 to complete a circuit from lead $L_1$ through switches 46 and 49 to lead $L_2$ to energize ignition means 28 thereby readying the burner mechanism for firing.

At the occurrence of a predetermined temperature in the area being conditioned, indicative of a demand for heat, switch 53 closes to complete a circuit through switches 45, 53 to energize solenoid 48 which opens gas valve 26 to supply fuel to burner mechanism 25.

Bimetallic element 43 responds to the rise in temperature of the flue gas in flue pipe 34 occasioned by the firing of burner mechanism 25 to move damper 40 against stop 41, the open position shown in FIGURE 1 of the drawings. Movement of damper 40 to the open position permits relatively unrestricted egress of flue gas through stack 34 into the ambient.

Pressure differential control device 35 is arranged to close switch 45 thereof at the occurrence of a predetermined difference in pressure between combustion air box 23 and flue pipe 34. Should the supply of combustion air at start-up to combustion air box 23 be reduced or interrupted, due for example, to malfunction of fan 31, switch 45 remains open. With switch 45 open, ignition means 28 and solenoid 48 cannot be energized and burner mechanism 25 cannot fire.

It is understood that upon firing of burner mechanism 25, pressure in combustion air box 23 increases. However, the increased pressure in combustion air box 23 is accompanied by a decrease in the resistance to flow of flue gas through stack 34 occasioned by the movement of damper 40 by bimetallic element 43 into engagement with stop 41. The pressure difference between combustion air box 23 and flue pipe 34, as sensed by control switch 35, accordingly remains approximately the same during operation of burner mechanism 25 as the pressure difference prior to operation of burner mechanism 25.

The difference in pressure across the heat exchanger may be relied upon as an indicator of good combustion. Since good combustion is itself a function of a proper air to fuel ratio, a reduction in combustion air can result in poor and unsafe combustion. Where a reduction in combustion air occurs, due for example to malfunction of fan 31, the resulting decrease in pressure in combustion air box 23 changes the pressure difference sensed by control device 35. Where the change in pressure difference sensed by control device 35 exceeds the response setting of the device, switch 45 opens to interrupt the energizing circuit to solenoid 48 thereby closing gas valve 26 to shut off burner mechanism 25. Opening of switch 45 additionally interrupts the energizing circuit to relay coil 56 opening switch 49 to interrupt the energizing circuit to ignition means 28. Restriction or blockage of stack 34 similarly changes the difference in pressure sensed by control device 35 and where the change exceeds the response setting of the device, switch 45 opens to shut off the burner mechanism 25 and ignition means 28 as explained heretofore.

In the embodiment illustrated in FIGURE 4, wherein like numerals refer to like parts, the position of damper 40 is controlled by a solenoid 55 connected thereto. Solenoid 55 is connected in series with control switch 45 and thermostatic switch 53.

Closure of switches 45 and 53 energizes both solenoids 48 and 55. Energization of solenoid 48 opens gas valve 26 whereby burner mechanism 25 is fired. Energization of solenoid 55 moves damper 40 against stop 41, the open position shown in dotted lines in FIGURE 4.

In the embodiment illustrated in FIGURES 5 and 6, wherein like numerals refer to like parts, line 37 connects one side of control device 35 with combustion air box 23 while the other side of control device 35 is connected to stack 34 by lines 58, 59. Line 59, which preferably has an interior diameter slightly greater than that of line 58, is connected to stack 34 downstream of line 58. Stack 34 may be restricted at 64 between the junction of lines 58 and 59 with stack 34. Line 59 is provided with a control valve 60. Solenoid 61 closes valve 60 when energized.

As seen in FIGURE 6 of the drawings, solenoid 61 is connected in series with control switch 45 and switch 53.

In the arrangement of FIGURES 5 and 6, with valve 60 open, the pressure difference sensed by control device 35, due to the downstream position of line 59 relative to line 58 is substantially greater than the pressure difference sensed by control device 35 through lines 37 and 58 at a given operating condition of the unit. By means of valve 60, which is opened at start-up, the pressure difference sensed by control device 35 is made substantially equal to the pressure difference sensed by control device 35 with valve 60 closed and the burner mechanism 25 fired. The closure of switches 45, 53 energizes solenoid 48 to open gas valve 26 and solenoid 61 to close valve 60 interrupting line 59.

Applicant's novel control arrangement for heating apparatus serves to establish a relatively high pressure difference across heating apparatus heat exchanger prior to firing of the apparatus burner mechanism. At the firing of the heating apparatus burner, the means conceived by applicant for establishing the relatively high pressure difference is rendered inoperative. The pressure difference across the heat exchanger, however, due to the operation of the burner mechanism, remains substantially the same. By applicant's arrangement, the response of a pressure differential control, connected so as to measure the pressure difference across the heating apparatus heat exchanger, is greatly enhanced.

While I have described a preferred embodiment of my invention, it will be understood that my invention is not limited thereto since it may be otherwise embodied within the scope of the following claims.

I claim:

1. In apparatus for heating which includes a combustion chamber connectable with a source of combustion air, a burner in said chamber adapted to communicate with a source of fuel, and a flue for conveying products of combustion into the ambient, the combination of means for actuating said burner upon a demand for heat; differential pressure type control means having communication with said combustion chamber and said flue, said control means being adapted, on a predetermined difference in pressure between said combustion chamber and said flue, to override said burner actuating means and render said burner inoperative; means for increasing the pressure difference across said control means before start-up of said burner; and means responsive to actuation of said burner to render said pressure increasing means inoperative.

2. Heating apparatus according to claim 1 in which said pressure difference increasing means comprises a restriction positioned within said flue substantially crosswise thereto, said restriction being movable to a position substantially paralleling said flue to permit relatively unrestricted flow of gas through said flue.

3. Heating apparatus according to claim 2 in which said burner actuation responsive means comprises a bimetallic element responsive to temperature conditions of the combustion products in said flue operably connected to said restriction, said bimetallic element being adapted in response to the increase in temperature of the combustion products flowing through said flue following actuation of said burner to move said restriction to said position paralleling said flue.

4. Heating apparatus according to claim 2 in which said burner actuation responsive means comprises a solenoid operator for said restriction adapted when energized to move said restriction to said position paralleling said flue, an energizing circuit for said solenoid operator, and switch means for completing said circuit in response to actuation of said burner.

5. Heating apparatus according to claim 1 including a first conduit connecting said control means with said flue, said pressure difference increasing means comprising a second conduit connecting said control means with said flue downstream of the connection of said first conduit with said flue; said burner actuation responsive means being adapted to interrupt said second conduit in response to actuation of said burner.

6. Heating apparatus according to claim 1 including a circuit for energizing said burner means, a first switch adapted when actuated to complete said circuit, and means responsive to a predetermined demand for heat for actuating said first switch to energize said burner means; a second switch adapted when actuated to interrupt said circuit to deenergize said burner means, said control means being adapted to actuate said second switch in response to a predetermined difference in pressure between said combustion chamber and said flue.

References Cited by the Examiner

UNITED STATES PATENTS 2,169,077   8/1939   Turner _____ 158—28

JAMES W. WESTHAVER, *Primary Examiner.*